United States Patent [19]

Chute

[11] 4,340,440
[45] Jul. 20, 1982

[54] COATING AND/OR ADHESIVE COMPOSITION AND METHOD FOR PREPARATION THEREOF

[76] Inventor: Challoner R. Chute, 918 Rugby Rd., Charlottesville, Va. 22903

[21] Appl. No.: 835,631

[22] Filed: Sep. 22, 1977

[51] Int. Cl.³ .............................. C09J 3/14; C08J 3/00
[52] U.S. Cl. .............................. 156/330.9; 427/385.5; 428/475.5; 528/326; 524/284; 524/548
[58] Field of Search ..................... 156/327, 331, 330.9; 428/474; 427/385 R; 260/31.2 N, 78 P, 34.2, 29.2 N

[56] References Cited

U.S. PATENT DOCUMENTS

| | | | |
|---|---|---|---|
| 2,342,387 | 2/1944 | Catlin | 260/29.2 N |
| 2,711,398 | 6/1955 | Barnes et al. | 260/31.2 N |
| 2,824,848 | 2/1958 | Wittcoff | 260/29.2 N |
| 2,889,611 | 6/1959 | Beoell | 8/114.6 |
| 2,951,054 | 8/1960 | Hess | 260/34.2 |
| 2,980,641 | 4/1961 | Cox | 260/29.2 N |
| 3,003,984 | 10/1961 | Black | 260/29.2 N |
| 3,019,076 | 1/1962 | Pardo et al. | 427/386 |
| 3,033,810 | 5/1962 | Black | 260/29.2 N |
| 3,060,141 | 10/1962 | Black | 260/29.2 N |
| 3,076,774 | 2/1963 | Black et al. | 260/29.2 N |
| 3,158,589 | 11/1964 | Glickman et al. | 260/31.2 N |
| 3,324,061 | 6/1967 | Tanquary et al. | 260/29.2 N |

FOREIGN PATENT DOCUMENTS 1263942  2/1972  United Kingdom .......... 260/29.2 N

Primary Examiner—John J. Gallagher

[57] ABSTRACT

A composition suitable for use as an adhesive or for forming coatings comprising a suspension of finely divided polypyrrolidone in aqueous formic acid and a method for the production thereof. The invention also includes a method for coating a substrate and for adhering substrates employing the above composition.

15 Claims, No Drawings

COATING AND/OR ADHESIVE COMPOSITION AND METHOD FOR PREPARATION THEREOF

BACKGROUND OF THE INVENTION

Polypyrrolidone, formed by the polymerization of 2-pyrrolidone, commonly termed Nylon-4, is used for the formation of films and fibers of high strength. Methods for the preparation of polypyrrolidone are described in U.S. Pat. No. 2,638,463 of May 12, 1953.

It has also been suggested in U.S. Pat. No. 2,711,398 of June 21, 1955 to form fibers and films from anhydrous solutions of polypyrrolidone and formic acid. The patent specifies that the utilization of anhydrous formic acid, i.e., 98-100%, is critical to the practice of the invention.

U.S. Pat. No. 2,889,611 to Bedell of June 9, 1959 discloses the treatment of various Nylon polymer filaments with strong solutions of formic acid under such conditions that the portion of Nylon dissolved in the formic acid solution is re-deposited or re-coated upon the external surface of the Nylon filament, which treatment increases the flexibility of the filament without decreasing the tensile strength thereof.

U.S. Pat. No. 3,060,141 discloses a method for preparing shaped articles from aqueous solutions of formic acid. The patent discloses the utilization of aqueous formic acid solutions containing from 10-50% by weight of water.

The properties of polypyrrolidone render it attractive as a coating or adhesive material; however, no satisfactory method or composition has been proposed to date for forming a composition suitable for depositing coatings or adhesive layers of polypyrrolidone on suitable substrates.

SUMMARY OF THE INVENTION

It is an object of the present invention to provide a coating and/or adhesive composition comprising polypyrrolidone and a method for the preparation thereof.

It is a further object of the present invention to provide a method for coating suitable substrates with a polypyrrolidone coating.

It is a still further object of the present invention to provide a method for adhering suitable substrates together with polypyrrolidone adhesive composition.

These and other objects are achieved by providing a coating and/or adhesive composition comprising a suspension of finely divided polypyrrolidone in an aqueous formic acid solution.

The composition is formed by incorporating into an aqueous medium a substantially saturated solution of polypyrrolidone in aqueous formic acid.

The polypyrrolidone polymer is suspended in the aqueous formic acid solution in very fine particle size form, i.e., on the order of non-filterable size or of filterable size but which are capable of forming a uniform coating upon removal of the solvent medium. The solution may be combined with conventional pigments and coating adjuvants to form coating and/or adhesive compositions or with drying assistants such as low vapor pressure hydrocarbons.

The composition is suitable for coating a wide variety of substrates including metal, such as aluminum, copper, brass, bronze, lead, zinc, silver, iron, and steel. The composition may also be employed to coat glass, ceramics, most plastic surfaces, wood and paper. When employing pure polypyrrolidone and utilizing no additives in the coating composition, clear, transparent coatings can be achieved.

DETAILED DESCRIPTION OF THE INVENTION

The coating and/or adhesive composition of the present invention comprising a suspension of finely divided polypyrrolidone in an aqueous formic acid solution is most suitably prepared by preparing a substantially saturated solution of the polymer in a hydrous formic acid solution. The substantially saturated solution is then intimately dispersed in an aqueous medium, preferably water, to form a suspension of the finely divided polypyrrolidone in the aqueous formic acid solution.

Particle size in the suspension is dependent upon the formic acid concentration, the entry speed of the saturated solution into the aqueous medium and the ambient temperature. The more dilute the acid in the aqueous medium in which the saturated solution is dispersed, the greater the particle size. The particle size can be reduced, however, by high speed agitation or mixing when the phases are admixed. Conversely, of course, slow mixing of the respective phases results in larger particle sizes.

It will be understood that the invention includes coating and/or adhesive compositions wherein the suspended polypyrrolidone is of any particle size suitable for forming uniform or adherent coatings upon removal of the solvent medium. It will further be understood that minimal experimentation will be required to ascertain the parameters of acid concentration, speed of mixing, etc., for the production of coating and/or adhesive compositions of desired characteristics.

The coating and/or adhesive composition should contain from about 2% to about 50%, by weight, of polypyrrolidone and from about 15% to about 60% of formic acid, based on the weight of the overall composition.

The substantially saturated hydrous formic acid solution of polypyrrolidone may be formed according to the disclosure in U.S. application Ser. No. 804,812, filed June 8, 1977, now U.S. Pat. No. 4,185,063. Generally, the concentration of the hydrous formic acid solution should range from about 25% to about 98%, preferably from about 91% to about 97% formic acid. Other carboxylic acids may be present in the solution such as acetic acid, etc. Care should be taken, however, to maintain the respective solutions generally free from air bubbles. The substantially saturated solution of polypyrrolidone and formic acid is then slowly admixed with rapid stirring into the aqueous medium, depending upon the degree of particle size desired, to form a suspension of the polypyrrolidone in the aqueous formic acid medium. Generally, the greater the ratio of aqueous medium to formic acid solution of polypyrrolidone, the coarser the particle size and, of course, the smaller the solid to liquid ratio and final concentration in the ultimate coating composition.

Compositions wherein the particle size is extremely small give rise to the most satisfactory coatings. It is to be understood, however, that large particle size suspensions also form satisfactory coatings.

The substantially saturated formic acid solution should contain from about 15% to about 50%, preferably from about 25% to about 40% of polymer. Generally, the rate of drying of the coating composition and the coating thicknesses are determined by the concentration of polymer in the acid. The rate of drying of the resultant coating is a function of solvent to solid ratio. The higher the ratio of solids to solvents, the faster the rate of drying. The acid concentrations generally determine the thickness of the resultant coating. In addition, drying can be accelerated by the use of certain hydrocarbons with low vapor pressure.

The characteristics of the final coating are dependent not only on the ratio of solids to solvent and the degree of dilution of the substantially saturated solution in the aqueous medium, but also on the original molecular weight of the polypyrrolidone. The low molecular weight polymers result in lower viscosity solutions and the formation of lighter finishes in the final coating. The final coating thickness can be controlled by adjusting the initial ratio of formic acid solution of polymers to aqueous medium.

It is generally preferred that the volume ratio of the aqueous medium to the substantially saturated solution of polypyrrolidone in formic acid range from about 100:10 to about 10:100. It is most preferred that the final coating composition contain from about 25 to about 750 parts, by volume, of a substantially saturated solution of polypyrrolidone in aqueous formic acid per 100 parts of water, dependent, of course, on the substrate to be coated and the coating characteristics desired.

The formic acid solution of polypyrrolidone may be admixed with the aqueous medium in any desired fashion. Generally, it is sufficient to merely pour the formic acid solution into the aqueous medium with rapid stirring. As the polypyrrolidone precipitates from the solution, it is intimately dispersed therein as a finely divided suspension.

The invention will be illustrated by the following non-limiting examples.

EXAMPLE 1

9 grams of polypyrrolidone were dissolved in 23.65 g of formic acid of 90% strength to provide a 38% solution of polypyrrolidone having a relative viscosity of 4.45 as determined in meta-cresol solution. All of the resulting solution was poured rapidly into 100 cc of distilled water with stirring. The resulting white dispersion was employed to coat a 12"×15" paper mat having a printed design. After dipping in the bath containing the dispersion for about 10 minutes, it was drained and allowed to dry. A crisp, clear, transparent finish resulted which was waterproofed and enabled the viewing of the underlying print.

EXAMPLE 2

1.9 g of polypyrrolidone were dissolved in 5.9 g of 88% formic acid to yield a 32% solution. The suspension was poured with stirring into a 50:50 water/88% formic acid (volume) mixture. The resulting dispersion was employed as a coating for aluminum, copper, iron, lead, and zinc substrates. A tough adhesive coat was formed on each of the surfaces.

Although it has been proposed to utilize polypyrrolidone and its various derivatives in a variety of ways, there has been little mention of the use thereof as an adhesive or bonding agent. The adhesive properties of the composition of the present invention will be apparent from the following non-limiting examples.

EXAMPLE 3

5.4 g of polypyrrolidone were dissolved in 9 g of formic acid (90%). The solution was characterized by a 3.7 relative viscosity.

The resulting viscous glue composition was utilized to adhere conventional tips on billard cue sticks. The tip and cue stick were coated with the adhesive composition and contacted under pressure for a time sufficient to allow the tip to dry. Identical tips were adhered to other billard cue sticks employing conventional epoxies, cyanoacrylates, acetates, butyrates, casinates, animal glues, etc. None of the latter equaled the polypyrrolidone adhesive composition for bonding strength.

EXAMPLE 4

1.3 g of polypyrrolidone were dissolved in 3.2 g of 90% formic acid to yield a solution having a relative viscosity of 4.42. After allowing sufficient time for complete solvation and release of contained air bubbles, the solution was employed to glue broken china. 3 hours drying time was allowed and the glued china item survived a complete cycle in a conventional dish washer.

The percentages expressed herein are by weight unless otherwise indicated.

I claim:

1. A composition suitable for forming coatings or for use as an adhesive consisting essentially of a suspension of finely divided polypyrrolidone in aqueous formic acid wherein said composition contains from 2% to 50% of polypyrrolidone and from 15% to 60% of formic acid, based on the weight of the composition.

2. The composition of claim 1 formed by incorporating into an aqueous medium a substantially saturated solution of polypyrrolidone in aqueous formic acid.

3. The composition of claim 2 wherein said aqueous formic acid has a concentration in the range of from 25 to 98%.

4. The composition of claim 2 wherein said aqueous formic acid has a concentration in the range of from 91% to 97% formic acid.

5. The composition of claim 2 wherein said substantially saturated solution contains from 15% to 50%, by weight, of polymer.

6. The composition of claim 2 wherein said substantially saturated solution contains from 25% to 40%, by weight, of polymer.

7. The composition of claim 2 wherein the volume ratio of said aqueous medium to said substantially saturated solution of polypyrrolidone in formic acid is in the range of from 100:10 to 10:100.

8. The composition of claim 2 wherein from 25 to 750 parts, by volume, of a substantially saturated solution of polypyrrolidone in aqueous formic acid having a concentration of from 91% to 97% is intimately dispersed in about 100 parts of water.

9. The composition of claim 8 containing 25 parts by volume of said substantially saturated solution per part of water.

10. A coating method comprising applying to a substrate the composition of claim 1.

11. A method for adhering a substrate to another substrate comprising interposing a layer of the composition of claim 1 between said substrates.

12. A method of preparing a coating or adhesive composition consisting essentially of from 2% to 50% of polypyrrolidone and from 15% to 60% of formic acid, based on the weight of the composition, comprising dispersing in an aqueous medium a substantially saturated solution of polypyrrolidone in formic acid.

13. The method of claim 12 wherein said aqueous formic acid has a concentration in the range of from 91% to 97%.

14. The method of claim 12 wherein said substantially saturated solution contains from 2% to 50% of polymer.

15. The method of claim 12 wherein the volume ratio of said aqueous medium to said substantially saturated solution of polypyrrolidone in formic acid is in the range of from 100:10 to 10:100.

* * * * *